United States Patent [19]

Shore et al.

[11] 4,282,197

[45] Aug. 4, 1981

[54] DI-IRON TRI-OSMIUM CARBONYL HYDRIDE COMPOUND AND ITS PREPARATION

[75] Inventors: Sheldon G. Shore, Columbus, Ohio; Jeffrey S. Plotkin, Monsey; Donna G. Alway, Eggertsville, both of N.Y.

[73] Assignee: The Ohio State University Research Foundation, Columbus, Ohio

[21] Appl. No.: 150,229

[22] Filed: May 15, 1980

[51] Int. Cl.$^3$ ............................................. C01G 1/04
[52] U.S. Cl. .................................... 423/417; 423/418
[58] Field of Search ................................. 423/414-418

[56] References Cited

U.S. PATENT DOCUMENTS 3,505,034  4/1970  L'Eplattenier et al. ......... 423/418 X

OTHER PUBLICATIONS

Ferrari et al., "Cleavage of Carbon–Hydrogen Bonds in Reactions of Dodecacarbonyltriosmium with Pentenes and Hexenes", Inorganica Chemica Acta, vol. 20 (1976), pp. 141–143.

Moss et al., "A New Route to Mixed-Metal Carbonyls Containing Osmium", Journal of Organometallic Chemistry, 23 (1970), pp. C23–C24.

Geoffroy, "Synthesis of Tetrahedral Mixed-Metal Clusters of the Iron Triad. Preparation and Characterization of $H_2FeRu_2Os(CO)_{13}$ and $H_2FeRuOs_2(CO)_{13}$," J.A.C.S., 99 (1977), pp. 7565–7573.

Deeming et al., "Addition Reactions of Polynuclear Osmium Hydrido Compound Leading to Associative Carbonyl Substitution and Catalytic Alkene Isomerization", Journal of Organometallic Chemistry, 114 (1976), pp. 313–324.

Keister et al., "The Interaction of $H_2Os_3(CO)_{10}$ with Alkenes Intermediates in Hydrogenation and Carbon–Hydrogen Bond Activation", J.A.C.S., 98:4, pp. 1056–1057, (1976).

*Primary Examiner*—Earl C. Thomas
*Attorney, Agent, or Firm*—Millard & Cox

[57] ABSTRACT

Disclosed is the new pentanuclear bimetallic cluster complex $H_2Fe_2Os_3(CO)_{15}$. Such complex is made by reacting a salt of $[HFe(CO)_4]^{1-}$ and $H_2Os_3(CO)_{10}$ in a solvent which solubilizes said salt to generate an $[HFe(CO)_4]^{1-}$ anion. Addition of a protic acid then causes the formation of $H_2Fe_2Os_3(CO)_{15}$.

13 Claims, No Drawings

DI-IRON TRI-OSMIUM CARBONYL HYDRIDE COMPOUND AND ITS PREPARATION The Government has rights in this invention pursuant to grant CHE-76-18705 awarded by the National Science Foundation.

CROSS-REFERENCE TO RELATED APPLICATIONS

This application is cross-referenced to the commonly assigned application of Sheldon G. Shore and Jeffrey S. Plotkin entitled "Iron Tri-Osmium and Cobalt Tri-Osmium Carbonyl Hydrides and Their Preparations", U.S. Ser. No. 150,228, filed May 15, 1980, the disclosure of which is expressly incorporated herein by reference.

BACKGROUND OF THE INVENTION

The present invention relates to mixed-metal carbonyl cluster compounds and more particularly to a novel mixed-metal carbonyl cluster compound.

$H_2FeOs_3(CO)_{13}$ was first isolated by Moss and Graham, *J. Organometal. Chem.*, 23, C23–C24(1970), as a by-product in 6% yield from the reaction between $H_2Os(CO)_4$ and $Fe_2(CO)_9$. Subsequently, Geoffroy and Gladfelter, *JACS*, 99, 7565–7573(1977), found that the reaction between the electron precise cluster $Os_3(CO)_{12}$ and $Fe(CO)_4{}^{2-}$ followed by protonation gave $H_2FeOs_3(CO)_{13}$ in 9% yield.

Other tri-osmium chemistry can involve the addition of nucleophilic organometallic reagents to the electronically unsaturated hydrido-osmium carbonyl cluster $H_2Os_3(CO)_{10}$ as a pathway to larger transition metal clusters. Such addition exploits the Lewis acid character of the tri-osmium system as exemplified by Stone's finding that certain electron rich $d^8$ and $d^{10}$ metal complexes will add to $H_2Os_3(CO)_{10}$ to yield a number of new heteronuclear transition metal clusters. For further studies on $H_2Os_3(CO)_{10}$, reference is made to the following: Keester et al, *JACS*, 98:4, 1056–1057 (1976); Deeming et al, *J. Organometal Chem.*, 114, 313–324 (1976); and Ferrari et al, *Inorganica Chemicta Acts*, 20, 141–143 (1976).

The present invention provides a new heteronuclear bimetallic cluster compound from $H_2Os_3(CO)_{10}$.

BROAD STATEMENT OF THE INVENTION

The present invention is the new bimetallic cluster compound $H_2Fe_2Os_3(CO)_{15}$. Such bimetallic cluster compound is made by establishing a reaction mixture comprising a salt of $[HFe(CO)_4]^{1-}$, $H_2Os_3(CO)_{10}$, and a solvent which solubilizes at least the $[HFe(CO)_4]^{1-}$ salt. The reaction mixture is established under conditions substantially free of molecular oxygen and of water at a temperature not substantially above about room temperature. Upon completion of this reaction, a protic acid is added to the reaction mixture to form said $H_2Fe_2Os_3(CO)_{15}$.

DETAILED DESCRIPTION OF THE INVENTION

An $[HFe(CO)_4]^{1-}$ salt is reacted with $H_2Os_3(CO)_{10}$ preferably in equal molar proportions, although an excess of either reactant may be used at the expense of such excess reactant. A variety of cations may be associated with the $[HFe(CO)_4]^{1-}$ salt as is readily apparent to those skilled in the art. Exemplary cations include alkali metals such as, for example, potassium, sodium, cesium, rubidium, with potassium being the preferred alkali metal cation of choice. Alternatively, a variety of other cations can be associated with the $[HFe(CO)_4]^{1-}$ anion and such compounds include amines (e.g. $[(Ph_3P)_2N]^{1+}$, where Ph is a phenyl group), tetraalkyl phosphoniums, tetraalkyl ammoniums, tetraphenyl phosphoniums, tetraphenyl ammoniums, and the like and mixtures thereof. $[(Ph_3P)_2N]^{1+}$ is the presently preferred cation for the present invention. Preparation of the $[HFe(CO)_4]^{1-}$ salt for entry into the reactions of the present invention is conventional.

The reactants are placed in a solvent which at least solubilizes the $[HFe(CO)_4]^{1-}$ salt for generation of the $[HFe(CO)_4]^{1-}$ anion. Preferred solvents for use in this reaction include ethers and preferably those ethers which are relatively volatile for ease in separating the desired $H_2Fe_2Os_3(CO)_{15}$ product during a later step of the process. Appropriate ethers include tetrahydrofuran, (THF) dimethyl ether, diethyl ether, glymes, and the like. Additional candidate solvents which may find some utility in the reaction include amines such as liquid ammonia and trialkyl amines, provided that they are unreactive with the reactants in the system and adequately solubilize the $[HFe(CO)_4]^{1-}$ salt for generation of the corresponding anion.

The temperature of the reaction mixture is maintained at about room temperature (about 25° C. for present purposes) or lower, as at temperatures exceeding about room temperature significant decomposition of reactants in the reaction mixture is experienced. Further, for suppressing degradation products in the reaction, the reaction mixture is maintained under conditions substantially free of molecular oxygen and water. Suitably, then, the reaction may be run under vacuum or under an inert gas, e.g. nitrogen, blanket as is necessary, desirable, or convenient.

Upon completion of this reaction, the reaction mixture then is combined with a protic (proton-donating) acid. It should be noted that the use of excess $[HFe(CO)_4]^{1-}$ salt may mean that small quantities thereof may be insoluble in the volume of solvent chosen, but then monitoring the disappearance of the insoluble $[HFe(CO)_4]^{1-}$ salt generally will indicate when the reaction is complete. For this protonation step of the process, aqueous acids may be used as no apparent decomposition by-products have been noted when using aqueous protic acids. Suitable protic acids include, for example, sulfuric acid, hydrochloric acid, phosphoric acid, hydrobromic acid, and the like and mixtures thereof. Additionally, oxygen may be contacted with the reaction mixture during the protonation step of the process, though preferably the protonation step of the process is practiced under conditions substantially free of molecular oxygen. It should be noted additionally, that the solvent used in the first step of the process can be removed from the reaction mixture prior to the protonation step. Upon completion of the protonation step of the process, the desired yellow $H_2Os_3Fe_2(CO)_{15}$ cluster product is separated from the reaction mixture by conventional techniques such as, for example, column or thin-layer chromatography. Yields of the cluster product can range up to 30% or more utilizing this process.

The bimetallic cluster compound of the present invention is an isomer of the $H_2Fe_2Os_3(CO)_{15}$ cluster synthesized in the cross-referenced application Ser. No. 150,228. The two isomers can be identified and distinguished based on the following spectral data.

| Characteristic | Present Invention | U.S.S.N. 150,228 |
|---|---|---|
| Mass Spec. | $\frac{m}{e} = 1110$ (cut-off) | $\frac{m}{e} = 1108$ (P-2) |
| Infrared Spectra: $\nu(CO)(cm^{-1})$ (cyclohexane, room temp.) | 2090(m), 2075(s), 2040(m), 2030(m), 2025(m), 2005(m), 1998(m), 1990(w) | 2110(w), 2100(m), 2082(s), 2070(s), 2045(s), 2038(m), 2020(s), 2002(m), 1990(w) 1985(sh) |
| Color: | Yellow | Red |

The mixed-metal cluster of the present invention is expected to have potential catalytic activity. Perhaps, such clusters may be chemically attached to supports to provide a heterogeneous catalyst system analogous to the systems described by Pierantozzi et al, *JACS*, 101:18, 5436–5438 (1979). Further, such supported cluster compound even may have further utility by its reduction on the support to produce a new bi-metallic metal catalyst candidate having unique surface properties. Further on this can be found by reviewing McVicker and Vannice, "The Preparation, Characterization, and Use of Supported Potassium-group VIII Metal Complexes as Catalysts for CO Hydrogenation", Exxon Research and Engineering Company, Corporate Pioneering Research Laboratories, Linden, N.J. (1979). Further on transition metal carbonyl cluster catalysts is disclosed by Basset and Smith in Abstracts of Invited Talks, XIX International Conference on Pure and Applied Chemistry, Prague, Czechoslovakia, pages 161–164 (1978). For a good discussion on cluster catalysis, reference is made to J. M. Basset and R. Ugo, *Aspects of Homogeneous Catalysis*, Chapter 2, Vol. 3, D. Reidel, Dordrecht, Holland (1977).

The following example shows how the present invention can be practiced, but should not be construed as limiting. In this application, all units are in the metric system, unless otherwise expressly indicated. Also, all citations disclosed herein are expressly incorporated herein by reference.

EXAMPLE $(Ph_3P)_2N[HFe(CO)_4]$ (0.1445 g, 0.204 mmole) was placed in a tip tube under a nitrogen atmosphere. The tip tube was attached to the side arm of a nitrogen filled 50 mL two-neck round bottom flask containing $H_2Os_3(CO)_{10}$ (0.0870 g., 0.102 mmole). The apparatus was evacuated, and approximately 15 mL THF (distilled from $LiAlH_4$, and stored over Na/benzophenone) was condensed into the flask at $-78°$ C. The solution was warmed to room temperature and magnetically stirred until all the $H_2Os_3(CO)_{10}$ had dissolved. The $(Ph_3P)_2N[HFe(CO)_4]$ was added to the purple solution. Upon addition of the salt, the solution immediately turned orange-red and became darker red as the reaction proceeded. The solution was stirred at room temperature for 48 hours. A total of 0.0735 mmole gas, non-condensable at $-196°$ C., was evolved. The solvent was removed from the solution under vacuum to leave a red oil.

Approximately 5 mL $CH_2Cl_2$ was condensed into the flask at $-78°$ C. The red solution was frozen at $-196°$ C., and HBr (0.204 mmole) was condensed into the flask. The solution was magnetically stirred at $-78°$ C. for one hour, and then at room temperature for twelve hours. A total of 0.060 mmole of non-condensable gas was evolved during this time. The $CH_2Cl_2/HBr$ was removed under vacuum to leave a red oil. Approximately 10 mL THF was condensed into the flask at $-78°$ C. A white precipitate settled out of the red solution. The solution was filtered, and the solvent removed from the filtrate to leave a red oil. The oil was dissolved in approximately 5 mL $CH_2Cl_2$ and its components separated by thin layer chromatography on a plate of silica gel (20×20 cm, 0.5 mm thick). An 80/20 $CH_2Cl_2$/hexane mixture was used as eluant. After two hours, six bands were observed. In order of decreasing Rf values, the bands were brown, four yellow bands, and an orange band. The second band was eluted, and the solvent removed by rotary evaporation. The resultant yellow powder was recrystallized from $CH_2Cl_2$/hexane to yield 0.036 g (32% yield) of a light yellow powder. The product was characterized as $H_2Fe_2Os_3(CO)_{15}$ by mass spectral analysis (parent ion, m/e=1110).

We claim:

1. A method for making $H_2Fe_2Os_3(CO)_{15}$ which comprises:
   (a) establishing a reaction mixture comprising a salt of $[HFe(CO)_4]^{1-}$, $H_2Os_3(CO)_{10}$, and a solvent which solubilizes said $[HFe(CO)_4]^{1-}$ salt to generate an $[HFe(CO)_4]^{1-}$ anion, under conditions substantially free of molecular oxygen and water, and at temperature not substantially above about room temperature; and
   (b) adding a protic acid to said reaction mixture to form said $H_2Fe_2Os_3(CO)_{15}$.

2. The method of claim 1 wherein the cation of said $[HFe(CO)_4]^{1-}$ salt is an alkali metal, a tetraalkyl or tetraaryl phosphonium compound, a tetraalkyl or tetraaryl quaternary ammonium compound, or an amine.

3. The method of claim 2 wherein said cation is potassium or $[(Ph_3P)_2N]^{1+}$, where Ph is a phenyl group.

4. The method of claim 1 wherein said solvent is an ether.

5. The method of claim 3 or 4 wherein said solvent is tetrahydrofuran, dimethyl ether, diethyl ether, or a glyme.

6. The method of claim 1 wherein the ratio of said $[HFe(CO)_4]^{1-}$ anion to said $H_2Os_3(CO)_{10}$ is about 1:1.

7. The method of claim 1 wherein said reaction mixture is established under an inert gas blanket.

8. The method of claim 1 wherein said protic acid addition is conducted in the presence of $H_2O$ and molecular oxygen at a temperature not substantially above about room temperature.

9. The method of claim 1 wherein said protic acid addition is conducted in the substantial absence of molecular oxygen and water at a temperature not substantially above about room temperature.

10. The method of claim 1 wherein said protic acid is HCl, HBr, $H_2SO_4$, or $H_3PO_4$.

11. The method of claim 5 wherein said protic acid is HCl, HBr, $H_2SO_4$, or $H_3PO_4$.

12. The compound $H_2Fe_2Os_3(CO)_{15}$, characterized as being yellow in color, having a mass spectral m/e value of about 1110 (cut-off), and infrared absorption peaks (cyclohexane solvent at room temperature) at about the following wave numbers $[\nu(CO), (cm^{-1})]$ 2090, 2075, 2040, 2030, 2025, 2005, 1998, and 1990.

13. The compound $H_2Fe_2Os_3(CO)_{15}$, characterized as being capable of being made by the reaction of $(Ph_3P)_2N[HFe(CO)_4]$ and $H_2Os_3(CO)_{10}$ in a molar ratio of 2:1 in tetrahydrofuran solvent under substantially anhydrous conditions at a temperature of about 25° C.; the removal of such tetrahydrofuran solvent and addition of methylene chloride solvent and hydrobromic acid in a molar ratio of 2:1 based on said $H_2Os_3(CO)_{10}$ at a temperature of not above about 25° C.; and the recovery of said $H_2Fe_2Os_3(CO)_{15}$ therefrom.

* * * * *